United States Patent [19]

Rowse

[11] Patent Number: 5,119,589
[45] Date of Patent: Jun. 9, 1992

[54] METHODS OF PRIMING SEED

[75] Inventor: Hugh R. Rowse, Oxhill, England

[73] Assignee: National Research Development Corporation, London, England

[21] Appl. No.: 705,599

[22] Filed: May 24, 1991

Related U.S. Application Data

[63] Continuation of Ser. No. 227,875, Aug. 3, 1988, abandoned.

[51] Int. Cl.$^5$ .............................................. A01C 1/00
[52] U.S. Cl. ........................................ 47/58; 47/57.6; 47/DIG. 9
[58] Field of Search .................... 47/57.6, 58, DIG. 9, 47/1 R, 56, 14–16, 65; 34/112, 141, 142; 427/212, 221, 4

[56] References Cited

U.S. PATENT DOCUMENTS

| 2,731,248 | 1/1956 | Wallace et al. | 47/DIG. 9 |
| 3,911,619 | 10/1975 | Dedolph | 47/14 |
| 3,974,307 | 8/1976 | Bowen | 427/212 |
| 3,991,517 | 11/1976 | Lewis | 47/57.6 |
| 4,370,945 | 2/1973 | Beckschulte et al. | 118/303 |
| 4,642,939 | 2/1987 | Suzuki | 47/14 |
| 4,830,505 | 5/1989 | Dunton | 366/2 |

FOREIGN PATENT DOCUMENTS

| 1091791 | 4/1961 | Fed. Rep. of Germany | 47/DIG. 9 |
| 538675 | 12/1976 | U.S.S.R. | 47/DIG. 9 |
| 871272 | 6/1961 | United Kingdom | 47/57.6 |
| 1057686 | 2/1967 | United Kingdom | 47/57.6 |
| 1142542 | 2/1969 | United Kingdom | 47/57.6 |
| 1382262 | 1/1975 | United Kingdom | 47/57.6 |
| 1583148 | 1/1981 | United Kingdom | 47/57.6 |
| 1586147 | 3/1981 | United Kingdom | 47/57.6 |
| 2163634 | 3/1986 | United Kingdom | 47/57.6 |

OTHER PUBLICATIONS

Heydecker, W., et al., (1977) Seed Sci. and Technol. 5, 353–425.
Bergsten, U. (1987) "Incubation of Rinus sylvestris L. and Priea abies L. (Kazst.) Seeds at Controlled Moisture Content as an Invigoration Step in DS Method" Dissection) Swedish University of Ag. Sci. (entire docmuent).
Bradford, K. J. (1986) HortScience, vol. 21(5), Oct. 1986.
Durrant and Loads–Seed Sci. & Technol.–Experiments to determine the optimum advancement treatment for sugar beet seed–Jun. 4, 1987.
Durrant and Jacggard–J. agrie. Sci., Camb.–Sugar-beet advancement to increase establishment and decrease bolting–Aug. 20, 1987.

Primary Examiner—James R. Feyrer
Attorney, Agent, or Firm—Cushman, Darby & Cushman

[57] ABSTRACT

Seed is primed by progressive hydration in a rotating drum (1) by water introudced as steam from a steam generator through an outlet pipe (5) to condense as a mist on the drum walls or as liquid water pumped onto the drum walls through several fine bore tubes to form a surface film. The amount of water and its rate of addition is controlled such that the seeds remain free flowing.

23 Claims, 4 Drawing Sheets

METHODS OF PRIMING SEED

This is a continuation of application Ser. No. 07/227,875, filed Aug. 3, 1988 now abandoned.

FIELD OF THE INVENTION

This invention relates to the priming of seed so that faster and more uniform germination will occur after planting in the field or greenhouse and to methods of treating seed, e.g. with fungicide.

BACKGROUND TO THE INVENTION

Methods of speeding up seed germination have been known for many years. Methods involving partial hydration of the seeds followed by drying back to the original moisture content are sometimes referred to as "Seed Hardening". Typically this has involved taking the seeds through a number of wetting and drying cycles. Seed priming can be carried out by partial hydration of the seeds by contact with osmotic solutions after which the seeds may be dried back to their original water content. On a small scale seeds can be primed by placing them on absorbent paper saturated with the osmotic solution. In principle seeds can be primed on a large scale by immersing them in the aerated osmotic solution but in practice this is difficult to achieve because the osmotic solutions tend to be viscous and to froth when aerated.

No method of seed priming has yet been found which is sufficiently convenient when carried out in bulk and sufficiently controllable, reproduceable and efficacious to be employed on a large scale in practice.

Known methods of contacting seeds with liquid for purposes other than seed priming are not suitable for use in priming seed. For instance, British Patent Specification No. 1382262 discloses germinating or sprouting seeds such as mustard and cress in a rotating drum into which water is sprayed and from which water drains form recycling. Such direct application of water to seeds will not produce a sufficiently even imbibing of water to be controllable to produce seed priming rather than prompt germination of at least a proportion of the seeds.

Similarly, the process of condensing a mixture of water vapour and pesticide vapour directly on to seeds described in DE-C-1091791 would not be controllable to lead to sufficiently even imbibition of just a sufficient quantity of water to produce seed priming. The process described is for applying pesticides to cereal crop grains, which are large compared to vegetable crop seeds such as carrot, onion and sugar beet for which an acceptable seed priming method is needed. Accordingly, the quantities of water which are to be applied in the method taught in DE-C11091791 are too small in proportion to the mass of the cereal grains to produce seed priming. Applying a seed-priming amount of water by such a method could not be controlled to avoid inducing prompt germination of a proportion of the seeds.

Similar comments apply to all the previously prepared systems in which water is applied directly to seeds as a spray or vapour as a carrier for disinfectants, pesticides, coating materials or the like.

SUMMARY OF THE INVENTION

The present invention now provides a method of priming seed comprising introducing seed into a seed treatment chamber to part fill the chamber, maintaining the seed in the chamber in a state of stirring motion, releasing water into the chamber at a controlled rate, distributing the released water in the form of a liquid evenly over at least a contact zone of the interior wall of the chamber above the level of the seed in the chamber, and contacting the seed with said wall bearing said distributed liquid water such that water is imbibed by the seed substantially only by contact with the water distributed on the wall of the chamber, said controlled rate being such that the seed remains free flowing.

Preferably the seed treatment chamber is rotated to produce said stirring motion. Stirring produced this way can be kept very gentle and is less likely to damage seed than contact with a moving stirrer member.

The seed treatment chamber is preferably in the form of a horizontally disposed cylinder and said rotation is about the horizontal axis thereof. A scraper member may be provided to displace seed from the rising wall of such a cylindrical chamber.

The released water is distributed over a portion of the wall of the chamber above the level of the seed in the chamber. As the film of water so produced passes through the bed of seed in the chamber, seed is picked up by the moist chamber wall, enhancing the stirring effect of the rotation and allowing very even progressive take up of water by the seed.

The water may be released as steam or water vapour and condensed as a thin film on said chamber wall portion to provide said distributed liquid water. This method can be adjusted to provide an extremely fine film of water on the chamber wall, no more than a misting of the wall if desired. The amount of water released into the chamber may be monitored by weighing the chamber and said weight measurements may be used to control the rate of water release. For instance a steam boiler can be activated and deactivated periodically in response to said weight measurements to control the rate of release of water as steam.

Alternatively, water may be released as liquid water directly sprayed or otherwise released onto the wall of the chamber. The water is released onto the chamber wall above the level of the seeds in the chamber, e.g. from a plurality of fine bore pipes leading onto the chamber wall.

The water may be pumped onto the chamber wall and the release rate may be controlled by controlling the operation of the pump.

Preferably, the chamber is of aluminium or is lined therewith.

After the required quantity of water has been imbibed, the seeds may be maintained in stirring motion for a period of several days. Such motion is preferably maintained by keeping the seeds part-filling a storage container and rotating said container about a substantially horizontal axis. The container may for instance be of glass or may be of aluminium or is lined therewith.

In most cases, it is preferred that said motion is maintained for a period of at least one week e.g. two weeks. The seeds may then be dried back or planted.

The continuation of stirring motion of the seeds after the hydration process has ceased prevents gradients of water content being established by evaporation and condensation. Furthermore, the growth of fungal hyphae appears to be inhibited. Accordingly the invention includes a method of priming seeds comprising contacting the seeds with a quantity of water sufficient to raise the water content thereof to a desired level and, after the required amount of water has been imbibed, maintaining the seeds in stirring motion for a period of one or more, preferably several days.

The seeds may be kept in motion in a container made for instance of glass or of aluminium or lined with aluminium.

The present invention comprises a method of priming seed in which the seed is treated in a seed treatment chamber into which moisture is introduced in a controlled manner so as to contact the seed in liquid form, e.g. a mist or surface film, from which the seed absorbs moisture up to a predetermined amount but remains free-flowing. By this method, one can make use of the tendency of dry seed to absorb water rapidly upon initial contact with water but terminate hydration at a moisture level which prevents premature germination. After termination the hydrated seeds may be incubated for a certain period to enable developmental processes within the seed to proceed. The seeds can then be dried back to a lower water content to facilitate storage or they can be sown directly without drying.

References above to "water" should be considered to include reference to aqueous media generally e.g. solutions containing fungicides or other active materials and also to include reference to water vapour as well as liquid water.

It is an important feature of the controlled hydration process of the present invention that the contact of individual seeds with liquid aqueous medium is for a limited duration or is intermittent and that the water should be sufficiently evenly distributed that the seeds do not become locally wet to the point of clumping together but remain free flowing. This is achieved by arranging for relative motion between a layer or film of water on the chamber wall and the seeds being treated so that the seeds come into and out of contact with the layer or film of water in the desired manner. Thus the water is distributed evenly to the continuously moving seeds which are thereby maintained in a free-flowing condition.

This can be achieved, for example, by placing the seeds in a horizontal rotating drum mounted on an electronic balance connected to a microcomputer so that the moisture content of the seeds can be continually monitored. Water may be fed into the drum by a device which liberates minute amounts of water vapour which condense as a thin film (mist) on the inner surface of the drum. As the drum rotates the thin film of moisture is carried round to the seeds in the bottom of the drum. The effect of absorbing moisture is that the seeds adhere to the drum and rise with the moving surface until they reach a scraper which causes them to fall back to the bottom of the drum and intimately mix with the bulk of the seed in the drum. The rate of steam or mist production may be controlled by the computer so that the water content of the seeds follows a predetermined pattern.

Alternatively the motion of the seeds in the drum can be monitored so as to prevent the addition of excess water. In this way water can be supplied at a rate at which the seeds can absorb it, rather than by following a predetermined pattern, water addition being slowed or halted if the seeds begin not to be free-flowing.

It will be appreciated that the incorporation of a control system in apparatus for carrying out the process of the present invention allows for extensive variation in the operating conditions, wetting and drying cycles, and other parameters of the process to deal with a wide range of species of seed many of which may have special requirements. The loading of the seeds with water may require different strategies according to seed type and other circumstances. For example a short cycle of about 24 hours may best suit certain seeds. Again, a wetting rate which follows either a steady rate, exponential, or other form of wetting curve can be programmed as required.

The process of the present invention can be followed to give rise to seed which has imbibed to a point at which if given further water it would germinate rapidly but is sufficiently dry to be free-flowing.

The invention also includes apparatus for the priming of seed, comprising a seed treatment chamber and means for introducing moisture therein so as to form a mist or surface film which makes contact with the seed, and control means for controlling the supply of moisture to the chamber to a predetermined amount or in a predetermined manner.

Thus the invention includes seed priming apparatus comprising a seed treatment chamber, means for producing stirring motion of seeds in the chamber in use, means for releasing water into the chamber on to an upper portion of the interior wall of the chamber so as to be evenly distributed over at least a contact zone of said wall in liquid form, and means for controlling the rate of said release such that in use water may be imbibed by the seed, as the water is released, by contact of the seed with the wall of the chamber so that the seed remains free flowing.

The means for producing stirring motion preferably comprises means for rotating said chamber about a substantially horizontal axis.

Said means for releasing water may comprise a steam generator and a steam release conduit directed on to an interior wall of the chamber or may comprise a pump to said container interior directed onto an interior wall thereof. Said conduits may terminate adjacent said wall in a plurality of fine bore tubes.

Said control means may comprise means for weighing said chamber to monitor the amount of water released thereto.

The seed priming process of the present invention avoids in use of excessive amounts of wetting fluid. In most applications the bulk of the added water, which may be condensed from the vapour phase, is imbibed into the seed leaving little or no surplus. This feature of the invention has the advantage that additional substances required for treatment of the seed, e.g. fungicides, can be used more economically. By adding controlled quantities of fungicide or other substance to the seed during treatment, the imbibition of water results in the transport of the added substance into the seed leaving little or no residue. Fungicides and/or other treatment substances can conveniently be dissolved or suspended in water applied to the seeds by the methods described herein.

Since the application of water containing fungicide during seed priming is followed by a period in which the seed undergoes some degree of development, fungal spores also may begin to develop. This may leave the fungus more prone to attack by the fungicide, thus opening the way for the fungus to be killed before the seed is planted.

BRIEF DESCRIPTION OF THE DRAWINGS

The invention will be illustrated by the following description of preferred embodiments with reference to the accompanying drawings in which.

DETAILED DESCRIPTION OF PREFERRED EMBODIMENTS

Figure 1:
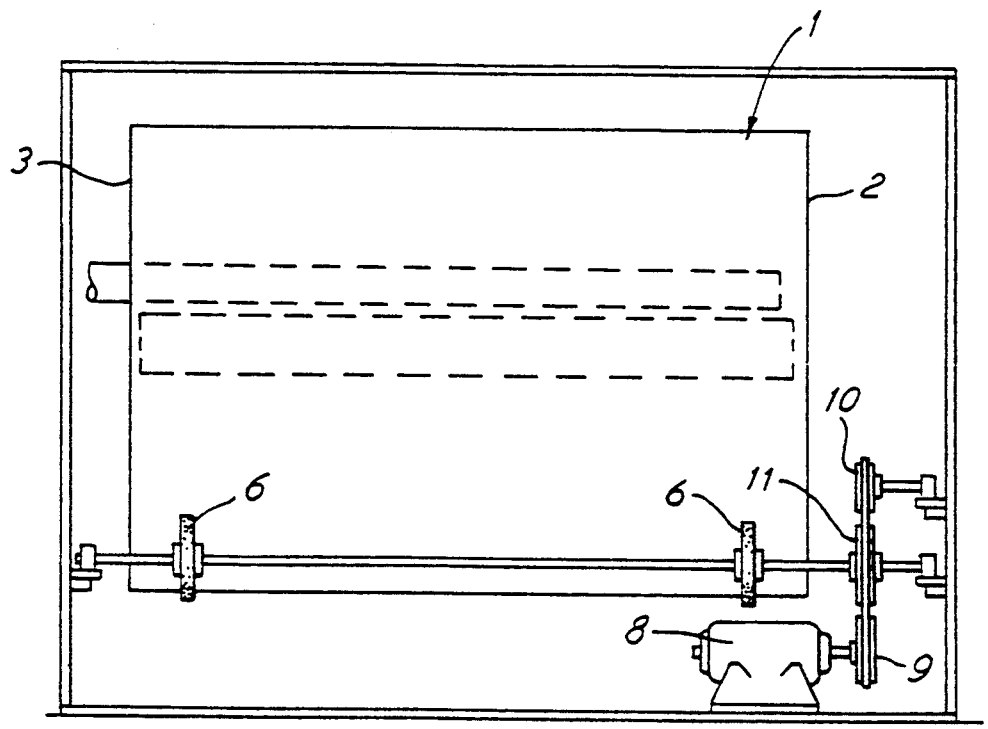
FIGS. 1, 2 and 3 are respectively a longitudinal view and two opposite end views of a seed treatment drum and associated equipment.
Figure 2:
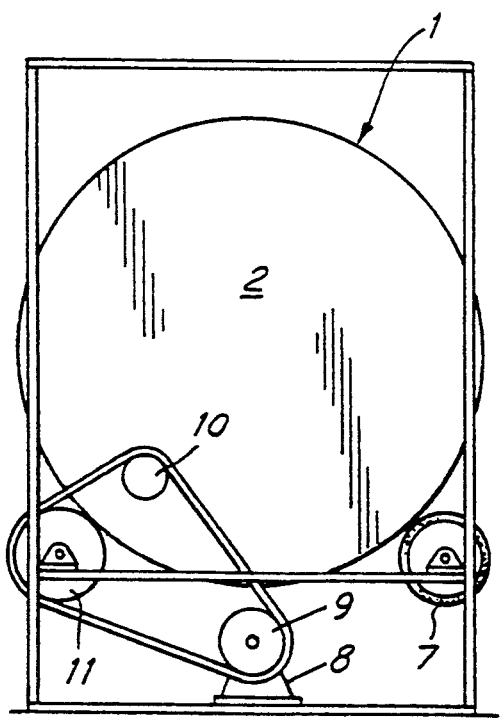
Figure 3:
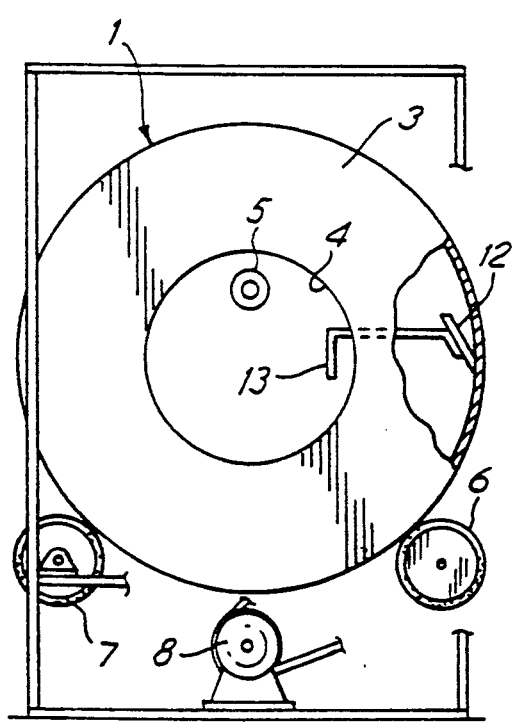

Referring now to FIGS. 1 to 3, the seed treatment chamber is a cylindrical aluminium drum 1 having an end closure 2 at its right-hand end (FIG. 2) and a partial end closure 3 at its left-hand end (FIG. 3). The closure 3 has a central aperture 4 through which extends a steam injection pipe 5 the construction of which is shown in detail in FIG. 4.

The drum 1 is mounted for rotation on two pairs of wheels 6 and 7 each pair being connected by a rotatable shaft. The pair of wheels 6 act as drive wheels driven by a motor 8, the other pair 7 being idler wheels. The motor 8 and drive assembly is situated at the closed end of the drum 1. The assembly comprises a driven wheel 9, tensioning wheel 10, and drive wheel 11 coaxial with and actuating the shaft carrying wheels 6.

Inside the drum 1 a longitudinal flexible scraper 12 is supported on an angle-iron 13 and makes contact with the inner cylindrical surface of the drum 1 so as to dislodge seeds adhering to the drum as the latter rotates.

Figure 4:
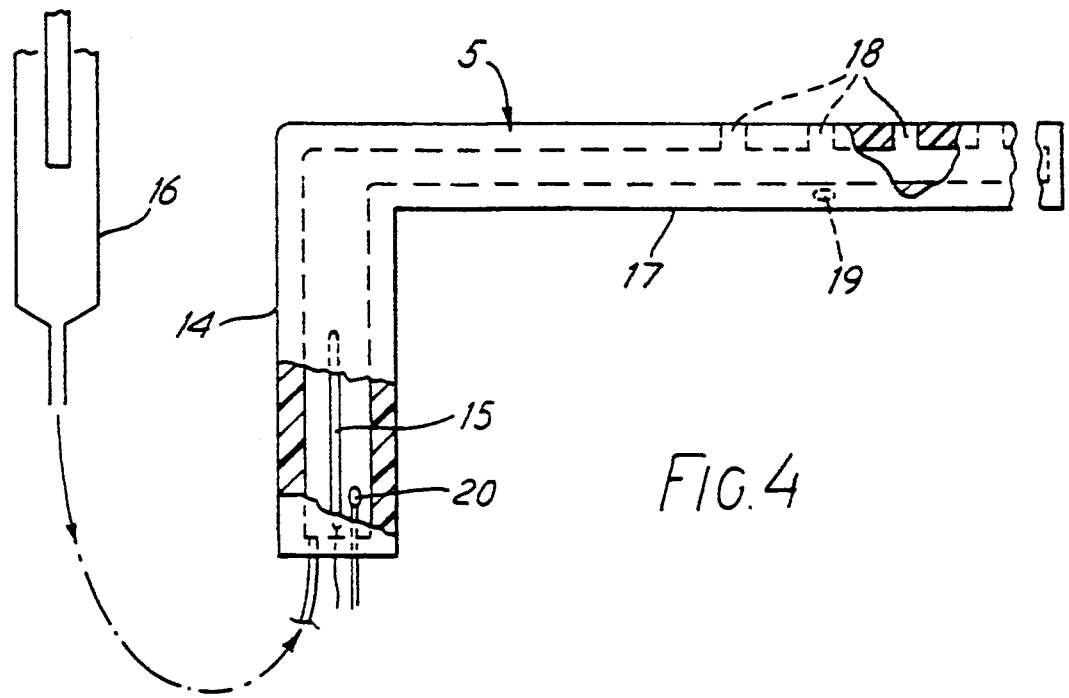
FIG. 4 is a detailed view of a steam injection pipe for use within the seed drum shown in FIG. 1.

Referring now to FIG. 4, the steam generator system comprises an inverted L-shaped steam injection pipe 5 of which the vertical limb 14 acts as a water reservoir containing an immersion heater 15. Water is supplied to the limb from a constant level device 16. The horizontal limb 17 of the pipe 5 is formed on its upper side with a number of steam release holes 18. Temperature monitoring is by means of the thermistor 19 on limb 17 and another thermistor 20 in the water held in limb 14. As seen in FIG. 3 the steam injection pipe 5 is supported in the upper part of the drum 1 so that steam released from the holes 18 will impinge upon the upper inner surface of the drum 1 and condense so as to form a film of moisture on this internal surface which then moves downwardly as the drum rotates in an anti-clockwise direction.

Figure 5:
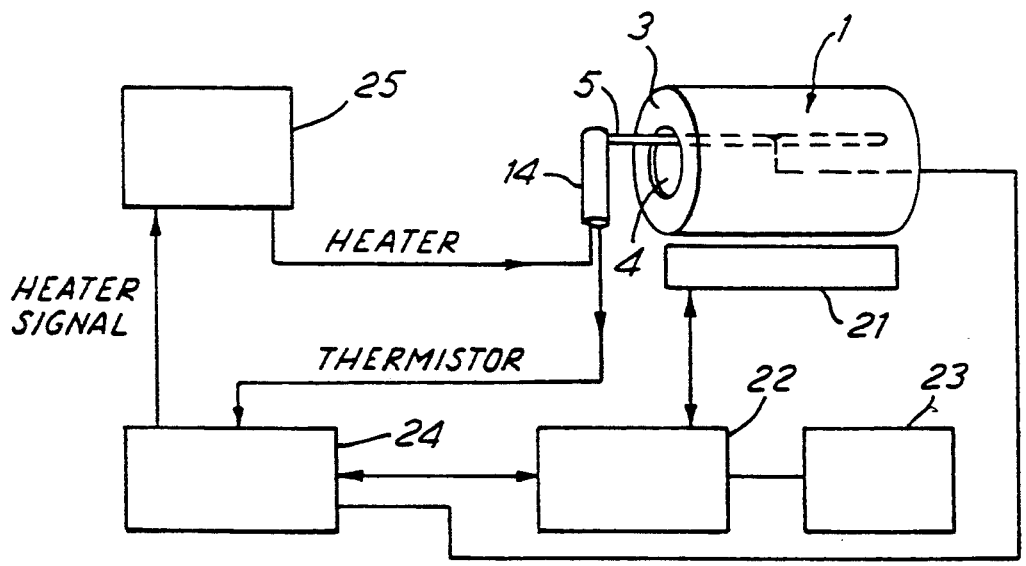
FIG. 5 is a schematic diagram of the system as a whole comprising the seed drum shown in FIG. 1, a control system, and other associated equipment.

Referring now to FIG. 5, the drum 1 is mounted on a balance 21 so that with seeds disposed in the lower part of the drum and subjected to a wetting operation as hereinafter described the cumulative weight of the seeds can be monitored continuously and controlled in accordance with a predetermined wetting pattern or cycle. The control system comprises a computer 22, printer 23, A/D controller interface 24 and power supply 25.

Figure 6:
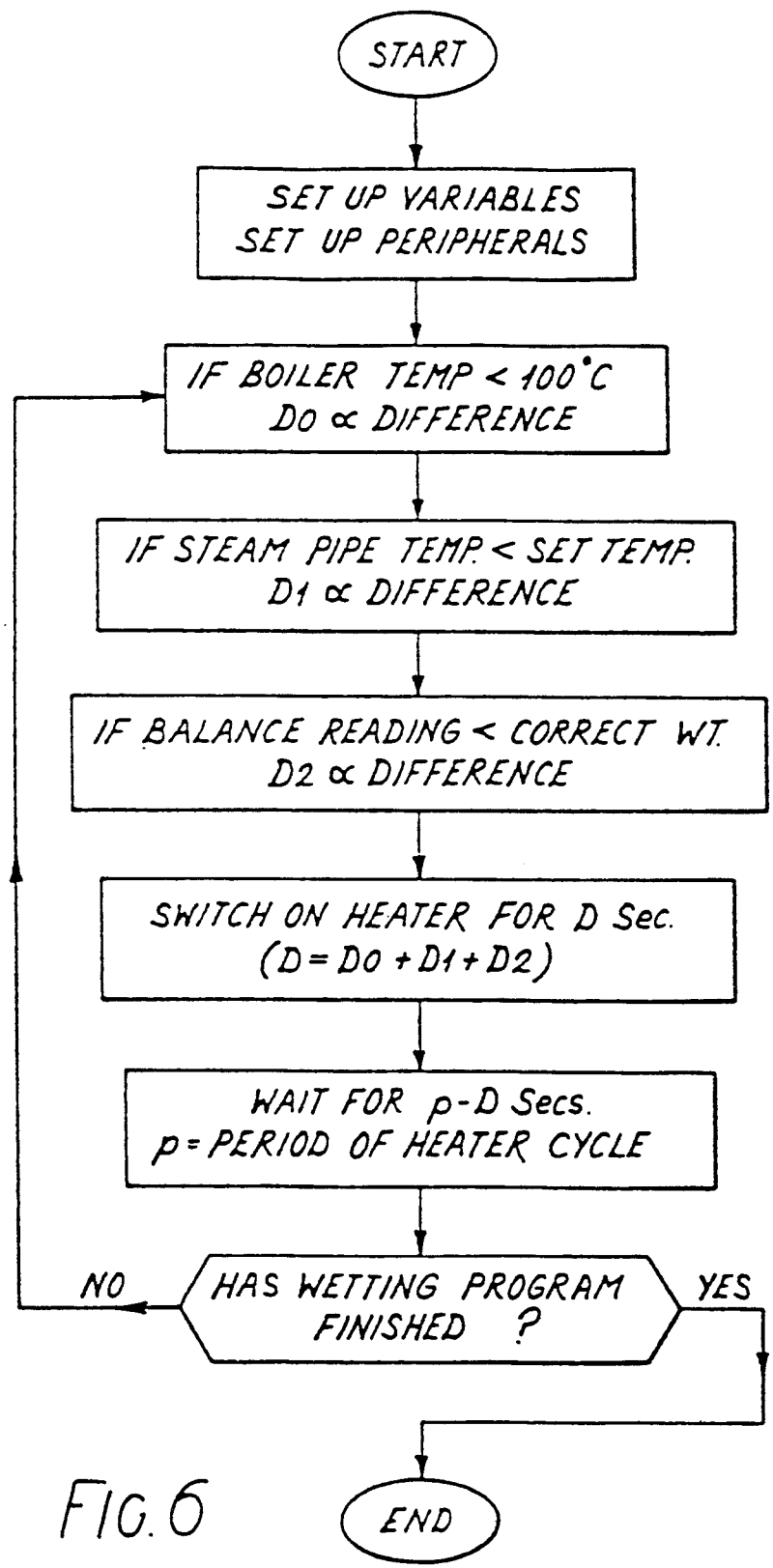
FIG. 6 is a schematic computer program.

An example of a computer program for use in accordance with the invention is illustrated in FIG. 6.

The printer 23 is used to print out the details of the wetting program (e.g. Sample weight and Reference, Initial seed water content, Required seed water content, Duration and Nature of wetting pattern). It also prints out at intervals the various temperatures and weights, so as to provide a record that the wetting pattern has been correctly followed.

The method of operation of the system is as follows.

Seeds to be treated are placed in the bottom of the drum 1 and slowly hydrated by a film of water condensed on to the upper inside surface of the drum, which is carried round to the seeds by the rotation of the drum. As the seeds absorb moisture they adhere to the climbing surface of the drum 1. The scraper 12 dislodges seeds from the surface of the drum causing them to fall back and mix with the rest of the seed sample. This gives good mixing and ensures that all seeds come in contact with the water film. The mixing also enables relatively dry seeds to obtain water from relatively wet ones which have been in contact with the water film. The process enables a very gradual hydration to be achieved so that at no time do the seeds appear wet or stick together. The steam issuing and condensing is visually imperceptible.

Steam from the steam generator is ducted to the inside of the drum 1 via the steam release holes 18. The thermistor 19 measures the temperature of the limb 17 of the pipe 5. When steam is issuing from the holes this temperature is close to 100° C. The computer 22 monitors the output from the thermistor 19, and when no water is required it adjusts the duty cycle of the heater 15 so that sufficient steam is supplied to the pipe 5 to keep it at a fixed holding temperature, but there is not enough for it to condense on to the drum. The purpose of holding the system at "incipient steam production" when no water is required is to obtain a rapid response when water has to be added to the seeds. The feedback loop between the thermistor 19 and the heater 15 ensures that the "incipient steam production" condition is maintained even when external conditions alter, e.g. cold water enters the limb 14 from the device 16.

The output of water vapour is variable from zero to a maximum rate determined by the wattage of the heater 15. Very high rates would increase the temperature inside the drum 1 because of the latent heat liberated from the condensation. For this reason other methods of producing a water film may be preferred for large scale use. Alternatively the outside of the drum 1 could be cooled.

If water is not added to the drum the seeds will, depending on the ambient humidity, lose water. Any desired wetting and drying patterns can be programmed into the computer. According to one strategy the seed is loaded with as much water as possible without causing subsequent germination in the shortest possible time, e.g. about 24 hours. It is necessary to decide in advance how much water the seeds can absorb in 24 hours. Estimates have been obtained from experiments where a sample of seed is allowed to absorb water through a membrane from a solution of polyethylene glycol.

Figure 7:
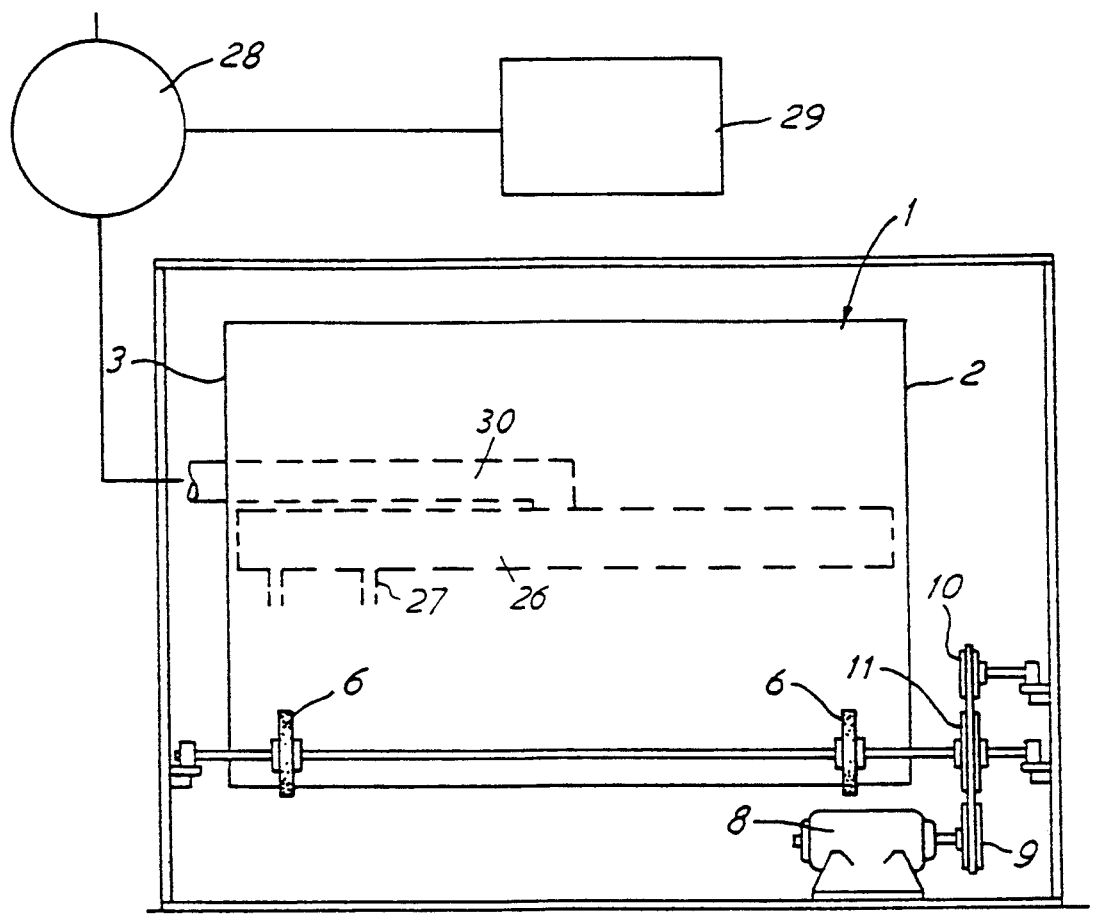
FIG. 7 is a view similar to FIG. 1 of a second example of a seed treatment drum.
Figure 8:
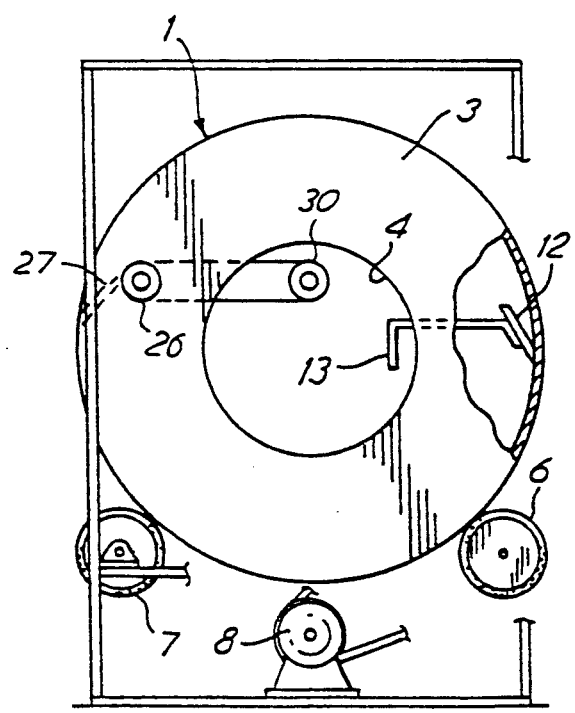
FIG. 8 is a view similar to FIG. 3 of the drum of FIG. 8.

As shown in FIGS. 7 and 8, an alternative form of seed priming apparatus for use in the invention resembles that shown in FIGS. 1 to 3 but employs an alternative method for introducing water into the treatment drum. The steam generator and steam pipe 5 is replaced by a pump 28, such as a peristaltic pump, connected via a pipe 30 which enters the treatment drum through the aperture 4 to a manifold 26 situated adjacent the drum wall. Manifold 26 has a multitude of outlets, to each of which is connected a very fine bore small plastics tube 27 extending to lie against the drum wall. The bore of the fine tubes 27 may be chosen such that tiny beads of water are drawn off by the drum as it rotates. These tubes 27 may for instance have an internal diameter of about 0.4 mm and may more generally have an internal diameter in the range of 0.1 to 1 mm.

Alternatively, one may employ a multichannel pump, each channel having a fine bore tube leading from the pump to the chamber wall, thus avoiding the use of a manifold 26 and reducing the chance of unequal flow through the individual fine tubes.

One may calculate the total amount of water required and arrange for this to be pumped at a constant rate by pump 28 over such a period as one may select, e.g. 24 hours, by adjusting the rate of pumping. Alternatively, more complex hydration regimes may be used. For this purpose, the pump 28 may be controlled by a control unit 29 to operate at a pumping rate which varies with time in the manner selected by the user. If the pump 28 is not capable of delivering an exactly predetermined output, the treatment apparatus may be mounted on a weighing balance and the weight of water added by the pump may be directly monitored and a weight signal may be fed back to the control unit 29 for use in controlling the rate of operation of the pump.

After the seeds have been hydrated they are placed partly filling a glass or aluminium container on a near-vertical rotating turntable (not shown) for about 2 weeks on which the container is rotated about a horizontal axis. They may then be sown directly or dried back to facilitate storage. The seeds may however be stored under cool conditions, e.g. at 0° C., for a period of weeks without drying. The purpose of the rotating turntable is to keep the seeds in relative motion so as to prevent small temperature gradients causing condensation in the container which would enable some seeds to germinate at the expense of the others. The rotation is also found to prevent the growth of fungal hyphae in the sample. Rotation rates of 0.1 to 10, e.g. 4 to 5 rpm are suitable.

EXAMPLES

The application of the process of this invention to the priming of seeds will now be illustrated by the following examples.

EXAMPLE 1

A 10 g sample of leek seed, with an original water content of 9% (all water contents are expressed on a dry weight basis) was treated in the apparatus of FIGS. 1 to 6. The computer was programmed to give a linear increase in water content so that the seeds reached 90% water content over a 20 hour period. The water content of the seeds after treatment was 89.9%. The treated seeds were then incubated by being tumbled in a drum rotating on a horizontal axis at 22° C. for two weeks at a rotation rate of about 5 rpm.

Germination tests were carried out on:
1. The untreated seeds.
2. The treated seeds after 2 weeks incubation but without drying (treated-undried).
3. The treated seeds after 2 weeks incubation after they had been dried back to 9% water content.

The tests were performed by germinating two replicate samples each of 150 seeds on moist filter paper at 20° C. Germinated seeds were counted and removed daily until no more seeds germinated. Three parameters were calculated from the results:
1. The percentage of the seeds that germinated.
2. The mean germination time of those seeds that germinated.
3. The standard deviation of the germination times which is a measure of the evenness of germination.

The results are shown in Table 1 below. This is only one example from many data sets. They all show a consistent reduction in the germination time and its standard deviation, and either little effect, or an increase in the percentage germination.

TABLE 1

|  | Germination (%) | Germination time (days) | S.D. Germination time (days) |
|---|---|---|---|
| Untreated | 79.4 | 4.37 | 2.17 |
| Treated-dried | 79.0 | 1.62 | 1.72 |
| Treated-undried | 83.4 | 0.84 | 0.71 |

EXAMPLE 2

1) Leeks—priming of 10 cultivars

Different cultivars (varieties) or even different seed lots of the same cultivar can vary in the way they respond to priming. To demonstrate that the result of Example 1 is not restricted to only one cultivar an experiment was carried out in which the seeds of ten cultivars of leek were primed either by a method according to the invention using hydration followed by two weeks rolling (hereafter called drum priming) or by placing the seeds on filter paper moistened with a solution of Polyethylene glycol 20,000 to give an osmotic potential of 1.5 MPa (hereafter called PEG priming). In this and subsequent Examples, such rolling was carried out at 15° C. After two weeks on the filter paper the seeds were removed and washed. Some seeds from both methods were dried back, others were left undried giving a total of four priming treatments (PEG primed dried, Drum primed dried, PEG primed undried, Drum primed undried). The germination tests were carried out on wet filter paper at 20° C.

Table 2 shows the effect of the treatments on the percentage germination. There was little difference between the priming treatments, all increased germination from an average of about 88% to about 92%. The effects on germination time are shown in Table 3. Here there are marked differences between the treatments, with the undried seed germinating faster than the dried seed, and the drum primed seed (dried or undried) germinating faster than the corresponding PEG primed seed. The undried drum-primed seed germinated fastest of all with a mean time of 0.59 days compared with 3.61 days for the means of the untreated seed. The Standard Deviation of germination times is a measure of the spread or the uniformity of germination. Low figures are regarded as good as they indicate a potential to produce a uniform crop. The S.D. of germination times is shown in Table 4. The trend here is similar to that found with the germination times, in that undried seed is better than dried seed and drum-primed better than PEG-primed. The uniformity of germination as measured by this parameter was increased by (i.e. SD reduced by) an average of about tenfold in the drum-primed undried seed.

Thus the drum priming is shown to be effective for a range of leek cultivars and for all cultivars it is produces results at least as good as, and often better than PEG priming.

TABLE 2

Effect of various priming treatments on the percentage germination of ten leek cultivars Germination Percentage

| Cultivar | Contr. | PD | DD | PU | DU |
|---|---|---|---|---|---|
| A | 93.0 | 92.0 | 92.0 | 96.7 | 93.3 |
| B | 81.0 | 89.0 | 87.0 | 90.0 | 84.0 |
| C | 85.7 | 92.3 | 92.0 | 95.6 | 93.0 |
| D | 77.7 | 93.0 | 87.0 | 87.7 | 87.7 |
| E | 83.3 | 91.6 | 93.3 | 91.0 | 94.3 |
| F | 88.7 | 92.0 | 93.0 | 94.7 | 94.7 |
| G | 98.0 | 97.7 | 97.0 | 97.3 | 97.0 |
| H | 88.3 | 89.3 | 87.3 | 91.7 | 88.7 |
| I | 94.0 | 93.3 | 95.7 | 93.0 | 93.3 |
| J | 86.0 | 94.3 | 96.3 | 93.0 | 93.0 |
| MEAN | 87.6 | 92.5 | 92.1 | 93.1 | 91.9 |

Code
Contr = Untreated Seed
PD = PEG Primed Seed (Dried)
DD = Drum Primed Seed (Dried)
PU = PEG Primed Seed (Undried)
DU = Drum Primed Seed (Undried)

TABLE 3

Effect of various priming treatments on the germination time (days) of ten leek cultivars Germination Time (Days)

| Cultivar | Contr. | PD | DD | PU | DU |
|---|---|---|---|---|---|
| A | 3.37 | 1.22 | 0.73 | 0.79 | 0.73 |
| B | 4.70 | 1.49 | 0.88 | 0.97 | 0.73 |
| C | 3.49 | 1.09 | 0.73 | 0.74 | 0.59 |
| D | 4.12 | 1.10 | 0.85 | 0.81 | 0.62 |
| E | 3.66 | 1.07 | 0.76 | 0.73 | 0.46 |
| F | 3.78 | 1.10 | 0.77 | 0.72 | 0.46 |
| G | 2.48 | 0.95 | 0.77 | 0.56 | 0.56 |
| H | 3.74 | 2.19 | 1.10 | 1.74 | 0.61 |
| I | 3.36 | 0.91 | 0.65 | 0.65 | 0.57 |
| J | 3.45 | 1.32 | 0.99 | 0.89 | 0.60 |
| MEAN | 3.61 | 1.25 | 0.82 | 0.85 | 0.59 |

Code
Contr = Untreated Seed
PD = PEG Primed Seed (Dried)
DD = Drum Primed Seed (Dried)
PU = PEG Primed Seed (Undried)
DU = Drum Primed Seed (Undried)

TABLE 4

Effect of various priming treatments on the standard deviation of germination time of ten leek cultivars SD Germination Time (Days)

| Cultivar | Contr. | PD | DD | PU | DU |
|---|---|---|---|---|---|
| A | 1.46 | 0.76 | 0.46 | 0.47 | 0.03 |
| B | 1.70 | 1.41 | 0.73 | 1.16 | 0.64 |
| C | 1.33 | 0.54 | 0.30 | 0.48 | 0.06 |
| D | 2.02 | 0.65 | 0.47 | 0.76 | 0.14 |
| E | 1.40 | 0.48 | 0.42 | 0.47 | 0.04 |
| F | 1.32 | 0.60 | 0.42 | 0.89 | 0.12 |
| G | 0.90 | 0.94 | 0.47 | 0.30 | 0.00 |
| H | 1.73 | 1.19 | 0.66 | 1.09 | 0.24 |
| I | 1.62 | 0.58 | 0.24 | 0.34 | 0.03 |
| J | 1.20 | 0.73 | 0.51 | 0.63 | 0.13 |
| MEAN | 1.47 | 0.79 | 0.47 | 0.66 | 0.14 |

Code
Contr = Untreated Seed
PD = PEG Primed Seed (Dried)
DD = Drum Primed Seed (Dried)
PU = PEG Primed Seed (Undried)
DU = Drum Primed Seed (Undried)

EXAMPLE 3

Leek—Effects of temperature and water stress on the germination of primed and natural seeds In Example 2 in tests of the ten cultivars, the seeds were germinated at 20° C. and zero water stress, conditions which are unlikely to be experienced by seeds sown in the field. The effects of four temperatures (5°, 10°, 15° and 20° C.) and five levels of water stress (0, 0.1, 0.2, 0.3 and 0.4 MPa) were tested on the four priming treatments and on untreated seeds. The effects of germination percentage, germination time and the S.D. of germination time are shown in Tables 5, 6 and 7 respectively. For all three parameters drum primed seed tended to be better than PEG primed seed and undried seed was better than dried seed. The most dramatic effect on germination occurred at low temperatures and low water stresses. For example the undried drum primed seed at 5° C. or 0 or 0.1 MPa germinated about twenty times faster than the untreated seed under the same conditions.

These results show that drum priming generally produces better results than PEG priming and that the most dramatic effects on germination are likely to occur under conditions of low temperature and water stress, conditions which are typically encountered by early sown crops.

TABLE 5

Effect of different temperatures and water stresses during germination on the percent germination of leek seeds primed by different methods Percentage Germination

| Stress | Temp. | Contr. | PD | DD | PU | DU |
|---|---|---|---|---|---|---|
| Water | 5 | 88.3 | 93.0 | 95.0 | 93.0 | 96.0 |
| | 10 | 95.3 | 94.0 | 95.3 | 96.3 | 97.0 |
| | 15 | 97.0 | 96.5 | 97.3 | 97.6 | 98.3 |
| | 20 | 96.7 | 98.0 | 96.3 | 97.0 | 98.7 |
| mean | | 94.3 | 95.4 | 96.0 | 96.0 | 97.5 |
| 0.1 MPa | 5 | 85.0 | 90.3 | 94.0 | 95.0 | 96.3 |
| | 10 | 93.7 | 89.3 | 94.3 | 94.0 | 97.0 |
| | 15 | 97.7 | 96.3 | 96.6 | 97.0 | 97.0 |
| | 20 | 95.7 | 95.3 | 94.3 | 96.3 | 96.0 |
| mean | | 93.0 | 92.8 | 94.8 | 95.6 | 96.6 |
| 0.2 MPa | 5 | 84.3 | 88.0 | 88.0 | 94.3 | 93.3 |
| | 10 | 93.7 | 84.7 | 96.5 | 95.0 | 94.7 |
| | 15 | 97.7 | 96.3 | 97.5 | 95.7 | 97.0 |
| | 20 | 97.0 | 95.0 | 93.0 | 93.0 | 98.7 |
| mean | | 93.1 | 91.0 | 93.8 | 94.8 | 95.9 |
| 0.3 MPa | 5 | 86.3 | 87.3 | 90.0 | 85.3 | 88.7 |
| | 10 | 91.0 | 76.3 | 91.3 | 94.7 | 94.7 |
| | 15 | 96.7 | 94.7 | 96.3 | 97.0 | 97.7 |
| | 20 | 88.0 | 88.7 | 91.3 | 94.0 | 94.3 |
| mean | | 90.5 | 87.0 | 92.2 | 92.8 | 93.9 |
| 0.4 MPa | 5 | 71.7 | 81.0 | 80.0 | 82.7 | 81.7 |
| | 10 | 94.3 | 44.7 | 84.0 | 89.3 | 92.7 |
| | 15 | 97.7 | 96.0 | 97.7 | 93.7 | 96.0 |
| | 20 | 73.7 | 81.0 | 91.7 | 92.3 | 98.7 |
| mean | | 84.2 | 75.7 | 88.4 | 89.5 | 92.3 |

Code
Contr = Untreated Seed
PD = PEG Primed Seed (Dried)
DD = Drum Primed Seed (Dried)
PU = PEG Primed Seed (Undried)
DU = Drum Primed Seed (Undried)

TABLE 6

Effect of different temperature and water stresses during germination of the mean germination time of leek seeds primed by different methods. Figures in brackets show data as percentage of the control (untreated) seed Germination Time (Days)

| Stress | Temp. | Contr. | PD | DD | PU | DU |
|---|---|---|---|---|---|---|
| Water | 5 | 17.04 | 3.93(23) | 2.52(15) | 3.81(22) | 0.87(5) |
|  | 10 | 7.16 | 2.30(32) | 1.40(20) | 1.65(23) | 0.82(11) |
|  | 15 | 3.41 | 1.34(39) | 0.99(29) | 1.10(32) | 0.75(22) |
|  | 20 | 2.80 | 1.26(48) | 0.84(25) | 0.94(36) | 0.76(29) |
| 10.1 MPa | 5 | 19.35 | 5.11(26) | 2.95(15) | 4.55(23) | 1.08(5) |
|  | 10 | 7.79 | 3.21(41) | 1.76(23) | 1.95(25) | 0.77(10) |
|  | 15 | 3.72 | 1.47(39) | 1.22(33) | 1.14(31) | 0.68(18) |
|  | 20 | 2.77 | 1.36(49) | 0.79(29) | 1.01(36) | 0.75(27) |
| 0.2 MPa | 5 | 24.40 | 6.71(27) | 4.17(17) | 7.11(29) | 2.27(9) |
|  | 10 | 8.74 | 5.43(62) | 3.53(40) | 2.77(32) | 0.97(11) |
|  | 15 | 4.5 | 1.86(41) | 1.36(30) | 1.51(33) | 0.67(15) |
|  | 20 | 3.65 | 1.86(51) | 1.09(30) | 1.33(36) | 0.68(19) |
| 10.3 MPa | 5 | 29.66 | 9.59(32) | 6.52(22) | 7.66(26) | 2.89(10) |
|  | 10 | 10.39 | 5.13(49) | 5.18(50) | 3.60(35) | 1.06(10) |
|  | 15 | 5.18 | 2.19(42) | 1.69(32) | 1.80(35) | 0.74(14) |
|  | 20 | 4.02 | 1.84(46) | 1.35(33) | 1.53(38) | 0.74(18) |
| 0.4 MPa | 5 | 30.20 | 11.88(39) | 9.56(32) | 11.52(38) | 3.62(12) |
|  | 10 | 11.70 | 7.92(68) | 6.14(52) | 4.30(54) | 1.79(15) |
|  | 15 | 5.57 | 2.94(53) | 1.82(33) | 2.31(41) | 0.92(17) |
|  | 20 | 4.86 | 2.47(51) | 1.33(27) | 1.76(36) | 0.84(17) |

Code
Temp = Temperature in C.
Contr = Untreated Seed
PD = PEG Primed Seed (Dried)
DD = Drum Primed Seed (Dried)
PU = PEG Primed Seed (Undried)
DU = Drum Primed Seed (Undried)

TABLE 7

Effect of different temperatures and water stresses during germination on the standard deviation of germination times of leek seeds primed by different methods. Figures in brackets show data as a percentage of the control (untreated) seed SD Germination Time (Days)

| Stress | Temp. | Contr. | PD | DD | PU | DU |
|---|---|---|---|---|---|---|
| Water | 5 | 3.91 | 2.69(69) | 1.37(35) | 2.45(63) | 0.42(11) |
|  | 10 | 1.96 | 1.52(77) | 0.95(48) | 0.72(37) | 0.25(13) |
|  | 15 | 0.93 | 0.53(75) | 0.51(55) | 0.72(77) | 0.23(25) |
|  | 20 | 0.88 | 0.77(87) | 0.94(107) | 0.38(43) | 0.06(7) |
| 0.1 MPa | 5 | 4.75 | 3.58(75) | 1.39(29) | 3.17(67) | 1.05(22) |
|  | 10 | 2.09 | 2.40(115) | 0.86(41) | 1.30(62) | 0.31(15) |
|  | 15 | 0.96 | 0.69(72) | 0.48(50) | 0.39(41) | 0.23(24) |
|  | 20 | 1.03 | 0.75(73) | 0.47(46) | 0.35(34) | 0.26(25) |
| 0.2 MPa | 5 | 6.37 | 4.27(67) | 2.53(40) | 5.45(86) | 1.44(23) |
|  | 10 | 2.20 | 4.77(217) | 2.40(109) | 1.57(73) | 0.73(33) |
|  | 15 | 1.24 | 0.90(73) | 0.53(43) | 0.76(61) | 0.27(22) |
|  | 20 | 1.41 | 1.23(87) | 0.61(43) | 0.68(48) | 0.05(3) |
| 0.3 MPa | 5 | 8.22 | 7.51(91) | 4.34(53) | 4.35(53) | 2.50(30) |
|  | 10 | 2.46 | 4.28(174) | 4.69(191) | 2.47(100) | 0.51(21) |
|  | 15 | 1.44 | 1.40(97) | 0.95(66) | 1.23(85) | 0.40(28) |
|  | 20 | 1.22 | 1.08(89) | 0.92(75) | 0.89(73) | 0.11(9) |
| 0.4 MPa | 5 | 7.37 | 9.71(132) | 8.39(114) | 6.72(91) | 3.28(45) |
|  | 10 | 2.69 | 7.75(288) | 5.21(194) | 2.08(77) | 1.65(61) |
|  | 15 | 1.49 | 1.72(115) | 1.09(73) | 1.61(108) | 0.70(47) |
|  | 20 | 1.70 | 1.49(88) | 0.81(48) | 0.93(55) | 0.27(16) |

Code
Temp = Temperature in C.
Contr = Untreated Seed
PD = PEG Primed Seed (Dried)
DD = Drum Primed Seed (Dried)
PU = PEG Primed Seed (Undried)
DU = Drum Primed Seed (Undried)

EXAMPLE 4

Leeks—Performance of Field-Sown Seed

Drum primed seeds were compared with seeds which had been primed in an aerated solution of PEG for two weeks. This method of priming probably represents the main alternative to drum priming for the large scale priming of seeds. The effect on the emergence times and the S.D. of emergence times of two seed lots with nominal germination percentages of 66% and 90% are shown in Table 8. The weather and soil conditions undoubtedly have a large effect on the way the primed seeds perform in the field, but the results from this example demonstrate that all the priming treatments reduced the emergence time by about three to four days but the S.D. of the emergence times tended to be greater with the primed seeds.

TABLE 8

Effect of various priming methods on field emergence time and the standard deviation of emergence times of two leek seed lots (Nominally 66% and 90% germination)

| | Nom. 66% Germ. | | Nom. 90% Germ. | | |
|---|---|---|---|---|---|
| | Dried | Undried | Dried | Undried | Mean |
| Emergence Time (Days) | | | | | |
| Control | 16.6 | — | 16.0 | — | 16.3 |
| PEG | 13.6 | 12.9 | 13.5 | 12.9 | 13.2 |
| Drum | 13.9 | 12.7 | 12.8 | 12.9 | 13.1 |
| | Mean Dried = 13.5 | | | Mean Undried = 12.9 | |
| SD of Emergence Times (Days) | | | | | |
| Control | 2.53 | — | 2.23 | — | 2.38 |
| PEG | 3.15 | 3.32 | 3.07 | 3.27 | 3.20 |
| Drum | 3.19 | 3.06 | 2.55 | 3.61 | 3.10 |
| | Mean Dried = 2.99 | | | Mean Undried = 3.32 | |

EXAMPLE 5

In a laboratory demonstration similar to that described for leeks in Example 3, the effect of temperature and water stress on the germination of untreated and drum primed onion seeds was investigated. The effects on percentage germination, germination time and S.D. of germination time are shown in Tables 9, 10 and 11 respectively. Improvements in germination were generally smaller than for leeks but still quite considerable. Undried seed germinated faster and more evenly than dried seed.

TABLE 9

Effects of different temperatures and water stresses during germination, on the percentage germination of onion seeds primed by different methods

| | | Percentage Germination | | |
|---|---|---|---|---|
| Stress | Temp. | Contr. | DD | DU |
| Water | 5 | 90.0 | 91.3 | 93.7 |
| | 10 | 95.3 | 95.0 | 94.0 |
| | 15 | 96.0 | 96.0 | 95.7 |
| | 20 | 93.7 | 94.7 | 96.7 |
| 0.1 MPa | 5 | 94.7 | 92.0 | 91.3 |
| | 10 | 94.6 | 96.0 | 93.3 |
| | 15 | 96.3 | 94.3 | 98.0 |
| | 20 | 91.0 | 95.0 | 92.3 |
| 0.2 MPa | 5 | 93.7 | 85.7 | 87.7 |
| | 10 | 79.0 | 82.0 | 86.7 |
| | 15 | 94.0 | 86.3 | 94.3 |
| | 20 | 89.7 | 96.7 | 93.0 |
| 0.3 MPa | 5 | 86.0 | 64.0 | 91.0 |
| | 10 | 50.3 | 59.3 | 68.7 |
| | 15 | 89.3 | 90.7 | 95.0 |
| | 20 | 69.3 | 85.3 | 91.3 |
| 0.4 MPa | 5 | 56.0 | 35.0 | 47.3 |
| | 10 | 29.7 | 21.3 | 37.8 |
| | 15 | 73.3 | 69.0 | 91.3 |
| | 20 | 21.0 | 67.7 | 85.7 |

Code
Temp. = Temperature C.
Contr. = Untreated Seed
DD = Drum Primed Seed (Dried)
DU = Drum Primed Seed (Undried)

TABLE 10

Effects of different temperatures and water stresses during germination on the mean germination time of onion seeds primed by different methods. Figures in brackets show data as percentage of the control (untreated) seeds

| | | Time to Germination (Days) | | |
|---|---|---|---|---|
| Stress | Temp. | Contr. | DD | DU |
| Water | 5 | 12.25 | 6.32(52) | 2.52(21) |
| | 10 | 7.20 | 4.90(68) | 3.66(51) |
| | 15 | 3.88 | 2.26(58) | 0.87(22) |
| | 20 | 2.64 | 2.15(81) | 1.02(39) |
| 0.1 MPa | 5 | 14.69 | 8.55(58) | 4.04(28) |
| | 10 | 11.06 | 5.72(52) | 3.40(31) |
| | 15 | 4.97 | 2.53(51) | 1.03(21) |
| | 20 | 3.61 | 2.50(69) | 1.07(30) |
| 0.2 MPa | 5 | 20.80 | 16.28(82) | 5.27(27) |
| | 10 | 19.08 | 7.27(38) | 6.17(32) |
| | 15 | 6.13 | 3.29(54) | 1.33(22) |
| | 20 | 4.95 | 3.43(69) | 1.19(24) |
| 0.3 MPa | 5 | 30.10 | 21.60(72) | 14.00(47) |
| | 10 | 21.30 | 10.00(48) | 11.75(56) |
| | 15 | 8.40 | 3.90(46) | 1.74(21) |
| | 20 | 6.79 | 4.03(59) | 1.91(28) |
| 0.4 MPa | 5 | 39.30 | 24.42(62) | 21.10(54) |
| | 10 | 22.00 | 16.40(74) | 16.00(72) |
| | 15 | 9.85 | 6.82(69) | 2.16(22) |
| | 20 | 7.05 | 4.45(63) | 2.20(31) |

Code
Temp. = Temperature C.
Contr. = Untreated Seed
DD = Drum Primed Seed (Dried)
DU = Drum Primed Seed (Undried)

TABLE 11

Effects of different temperatures and water stresses during germination on the standard deviation of germination times of onion seeds primed by different methods. Figures in brackets show data as a percentage of the control (untreated) seeds

| | | SD Germination Time (Days) | | |
|---|---|---|---|---|
| Stress | Temp. | Contr. | DD | DU |
| Water | 5 | 3.27 | 3.47(106) | 1.65(50) |
| | 10 | 1.90 | 2.24(118) | 2.04(107) |
| | 15 | 1.01 | 0.92(91) | 0.47(47) |
| | 20 | 1.02 | 0.98(96) | 0.65(64) |
| 0.1 MPa | 5 | 4.72 | 5.21(110) | 3.96(84) |
| | 10 | 2.36 | 2.34(99) | 2.29(97) |
| | 15 | 1.72 | 0.97(56) | 0.78(45) |
| | 20 | 1.97 | 1.11(56) | 0.71(36) |
| 0.2 MPa | 5 | 10.10 | 12.00(119) | 4.08(53) |
| | 10 | 9.28 | 2.90(31) | 5.47(59) |
| | 15 | 2.18 | 1.18(54) | 0.97(44) |
| | 20 | 2.68 | 1.53(57) | 0.73(27) |
| 0.3 MPa | 5 | 18.30 | 14.50(79) | 15.20(83) |
| | 10 | 9.42 | 5.29(63) | 11.50(122) |
| | 15 | 3.49 | 1.93(55) | 1.22(33) |
| | 20 | 4.79 | 1.80(37) | 1.07(22) |
| 0.4 MPa | 5 | 19.60 | 14.40(73) | 18.00(92) |
| | 10 | 8.60 | 7.22(83) | 12.00(138) |
| | 15 | 3.50 | 5.47(156) | 1.57(45) |
| | 20 | 2.78 | 1.95(70) | 1.28(46) |

Code
Temp. = Temperature C.
Contr. = Untreated Seed
DD = Drum Primed Seed (Dried)
DU = Drum Primed Seed (Undried)

In contrast to the laboratory experiment, the performance of drum primed onion seed sown in the field was very good. In a demonstration which involved the use of starter fertiliser (or water) applied beneath the seed during drilling, drum-primed dried, and undried seed emerged on average 2.4 and 4.7 days earlier than the untreated seed (Table 12). As with leeks the priming treatments had little effect on the spread of emergence in the field. The beneficial effects of starter fertiliser appeared to be additive to those of priming, so that addition of 8 ml/m of starter increased the mean seedling weight from 0.13 to 0.18 g for untreated seed, but seedling weight was further increased to 0.31 g when undried drum primed seed was used with 8 ml/m of starter fertiliser.

TABLE 12

Onions: effect of drum priming and starter fertilizer

| | Contr. | Dried | Undried | Mean |
|---|---|---|---|---|
| Emergence Time (Days) | | | | |
| Normal | 21.4 | 19.3 | 15.8 | 18.8 |
| 8 ml/m Water | 22.6 | 20.5 | 17.0 | 20.0 |
| 8 ml/m Fert | 22.3 | 19.7 | 17.5 | 19.8 |
| 18 ml/m Water | 23.0 | 19.7 | 17.8 | 20.2 |
| 18 ml/m Fert | 22.4 | 20.1 | 19.8 | 20.8 |
| | 22.3 | 19.9 | 17.6 | |
| SD of Emergence Times (Days) | | | | |
| Normal | 2.57 | 2.75 | 2.85 | 2.72 |
| 8 ml/m Water | 2.92 | 3.31 | 3.00 | 3.08 |
| 8 ml/m Fert | 2.83 | 2.12 | 2.71 | 2.55 |
| 18 ml/m Water | 3.06 | 2.56 | 2.68 | 2.77 |
| 18 ml/m Fert | 2.18 | 2.18 | 3.32 | 2.56 |
| | 2.71 | 2.58 | 2.91 | |
| Mean Fresh Weight (g/plant) | | | | |
| Normal | 0.13 | 0.15 | 0.19 | 0.16 |
| 8 ml/m Water | 0.12 | 0.14 | 0.16 | 0.14 |
| 8 ml/m Fert | 0.18 | 0.21 | 0.31 | 0.23 |
| 18 ml/m Water | 0.18 | 0.15 | 0.18 | 0.17 |
| 18 ml/m Fert | 0.18 | 0.18 | 0.20 | 0.19 |
| | 0.16 | 0.17 | 0.21 | |

EXAMPLE 6

Brussel Sprouts

Table 13 shows the effect of drum priming on Brussels Sprouts seeds germinated at 10° C. with no water stress. When the seeds were moistened to 79% water content, approximately one third of them germinated within one week during the rolling process, but the germination time of those remaining undried seeds reduced from 3.4 to 0.51 days. Rolling for two weeks rather than one week produced no additional benefit When the seeds were moistened to a lower water content (74.9%) only 5% of the seeds germinated while rolling and the germination time was reduced to 0.18 days after a week of rolling. Again there was no advantage in rolling for two weeks.

TABLE 13

Effect of two drum priming treatments of the germination of Brussels Sprouts seeds.

| | 0 Weeks | 1 Week | 2 Weeks |
|---|---|---|---|
| Untreated Seeds (6.4% MC) | | | |
| Percent Germination | 99.3 | | |
| Time to Germination (Days) | 3.37 | | |
| SD Germination Time (Days) | 0.91 | | |
| Drum Primed (79% MC) | | | |
| Percent Germination | 99.0 | 100 | 99.7 |
| Time to Germination (Days) | 1.76 | 0.51 | 0.75 |
| SD Germination Time (Days) | 1.13 | 0.33 | 1.68 |
| Pre Germination | — | 34.4 | 33.0 |
| Drum Primed (74.9% MC) | | | |
| Percent Germination | 99.3 | 99.3 | 98.3 |
| Time to Germination (Days) | 2.64 | 0.18 | 0.29 |
| SD Germination Time (Days) | 1.56 | 0.77 | 0.79 |
| Pre Germination | — | 5 | 4.5 |

EXAMPLE 7

Carrots

It had been anticipated that soluble germination inhibitors in carrot seed might interfere with the drum priming process. In conventional priming these inhibitors are washed out by the PEG solution and consequently are not a problem. However, tests in which carrot seed was germinated at 10° C. with no water stress at different spacings on moist filter paper, failed to show any effect of spacing on germination, which suggests that soluble inhibitors are not a problem.

The results of a single drum priming experiment are shown in Table 14. Drum priming alone for 24 hours without further rolling, reduced the germination time from 6.8 to 4.9 days. Rolling the moist seed from a further one or two weeks reduced the germination time to 2.3 and 1.9 days respectively. Clearly the drum priming process is effective for carrot seed.

TABLE 14

Effect of drum priming on the germination of carrot seed.

| | 0 Weeks | 1 Week | 2 Weeks |
|---|---|---|---|
| Untreated Seeds (7.04% MC) | | | |
| Percent Germination | 92.3 | | |
| Time to Germination (Days) | 6.78 | | |
| SD Germination Time (Days) | 1.95 | | |
| Drum Primed Seed (not dried back 70.2% MC) | | | |
| Percent Germination | 93.7 | 88.0 | 91.7 |
| Time to Germination (Days) | 4.92 | 2.29 | 1.89 |
| SD Germination Time (Days) | 1.88 | 1.43 | 1.24 |

EXAMPLE 8

Sugar Beet

Sugar Beet, like carrots are reputed to have germination inhibitors in the fruit which surrounds the seed. The following Example shows no evidence that such inhibitors affect the process according to the invention.

The seed used in this Example was natural (i.e. not rubbed or pelleted) monogerm seed. The seed was dried back after one day of rolling (i.e. one day in the hydrating drum plus one day rolling). This prevented premature germination, and gave a very useful reduction in germination time at 20° C. and zero water stress from 3.1 to 1.6 days as shown in Table 15.

TABLE 15

Effect of drum priming germination of sugarbeet seeds.

| | Untreated Seed | Drum Primed (Dried Back) |
|---|---|---|
| Percent Germination | 80.5 | 85.0 |
| Time to Germination (Days) | 3.14 | 1.64 |
| SD Germination Time (Days) | 1.07 | 1.13 |

EXAMPLE 9

Fungal Diseases

It has been shown that in general the percentage of seeds carrying fungal contamination is either unaffected or even reduced by the processes of the invention. This is in marked contrast to priming with PEG (either on paper or in bulk liquid) when fungal contamination invariably increases. In one test, a sample of onion seed infected with the seed-borne disease "neck rot", was drum primed in an aluminium chamber followed by rolling incubation as described previously, and no trace of infection could be detected on the treated seed. In a comparison test it was found that if the seeds are not rolled following hydration they rapidly become stuck together by fungal hyphae.

It can be seem therefore that fungal growth can be inhibited by the rolling process described above and/or by contacting the seeds with aluminium or a source thereof during hydration and/or rolling and such processes for inhibiting fungal growth are within the scope of the invention.

I claim:

1. A method of priming seeds comprising contacting the seeds with a quantity of water sufficient to raise the water content thereof to a required level which allows pregerminative metabolic processes to take place within the seeds and which is limited to a level which precludes radicle emergence from the seeds, allowing the seeds to imbibe said required level of water while maintaining the seed coats of the seeds substantially exposed to the atmosphere and in a condition allowing for the free exchange of gas with the atmosphere, and after the required amount of water has been imbibed maintaining the seeds in stirring motion for a period of several days.

2. A method as claimed in claim 1, wherein said motion is maintained by keeping the seeds partially-filling a storage container and rotating said container about a substantially horizontal axis.

3. A method as claimed in claim 1, wherein said motion is maintained for a period of at least one week.

4. A method of priming seed comprising introducing seed into a seed treatment chamber to partly fill the chamber, maintaining the seed in the chamber in a state of stirring motion, releasing water into the chamber at a slow, controlled rate which precludes exposure of the seed to free flowing, unbound water in an amount which will surround the seed, contacting the seed with said water to hydrate the seed substantially without covering the seed with a continuous layer of water, distributing the released water by said stirring motion evenly amongst the seed in the chamber, said controlled rate being such that the surface of individual seeds remains sufficiently dry that the seed remains free flowing whilst the water content of the seed is progressively and uniformly raised to a desired maximum value and maintaining the seed in at least intermittent notion for a period sufficient to allow pregerminative metabolic processes to take place within the seed yet preclude radicle emergence, whereby, the surface of the seed is prevented from being covered by a layer of bound, unabsorbed water which precludes direct gas exchange with the atmosphere of the surface of the seed.

5. A method as claimed in claim 4, further including the step of rotating the chamber to effect said stirring motion.

6. A method as claimed in claim 5, further including the step of providing a horizontally disposed cylinder as said chamber, and providing said stirring motion by rotating said cylinder about a horizontal axis.

7. A method as claimed in claim 6, wherein the water is released as water vapor and is condensed as a thin film on the said chamber wall above the level of the seed in the chamber to provide said water.

8. A method as claimed in claim 7, wherein the amount of water released into the chamber is monitored by weighing the chamber and weight measurements are used to control the rate and amount of water release.

9. A method as claimed in claim 8, further including providing said water in a gas phase.

10. A method as claimed in claim 6, wherein said water is released as liquid water on to the wall of the chamber above the level of the seeds in the chamber.

11. A method as claimed in claim 10, wherein the water is released from a plurality of fine bore pipes having a bore diameter of from 0.1 to 1 mm on to the chamber wall.

12. A method as claimed in claim 10, further comprising the step of presenting said water to said wall by the action of a pump, and controlling the rate and amount of said water by controlling the action of said pump.

13. A method as claimed in claim 4, wherein said motion is maintained by keeping the seeds part-filling a storage container and rotating said container about a substantially horizontal axis.

14. A method as claimed in claim 4, wherein said motion is maintained for a period of at least one week.

15. A method as claimed in claim 4, where said seeds are dried back after said period of days.

16. Seed priming apparatus comprising a seed treatment chamber, means for producing stirring motion of seeds in the chamber in use so that the seeds are stirred uniformly, means for releasing water into the chamber on to an upper portion of the interior wall of the chamber so as to be evenly distributed over at least a contact zone of said wall in liquid form, and means for controlling the rate of said release such that in use water may be imbibed by the seed by contact with only a portion of the seed coat without the formation of a continuous film of water over the entire seed coat of the seed, as the water is released, by contact of the seed with the wall of the chamber so that the seed remains free flowing whereby, in operation. at least a portion of the bare coats of the seeds are maintained in direct fluid communication with the atmosphere.

17. Apparatus as claimed in claim 16, wherein the means for producing stirring motion comprises means for rotating said chamber about a substantially horizontal axis.

18. Apparatus as claimed in claim 16, wherein said means for releasing water comprises a steam generator and a steam release conduit directed onto an interior wall of the chamber.

19. Apparatus as claimed in claim 16, wherein said means for releasing water comprises a pump for connection to a source of water, and a conduit from said pump to said chamber interior directed on to an interior wall thereof.

20. Apparatus as claims in claim 19, wherein said conduit terminates adjacent said wall in a plurality of fine bore tubes having a bore diameter of from 0.1 to 1 mm.

21. Apparatus as claimed in claim 16, wherein said control means comprises means for weighing said chamber to monitor the amount of water-released thereto.

22. In a seed priming apparatus comprising a seed treatment chamber, means for producing stirring motion of seeds i the chamber in use so that the seeds are stirred uniformly, the improvement comprising means for releasing water into the chamber to contact seeds in said chamber over an area of less than the total surface area of the exterior of their seed coats as the seeds are stirred at a slow, controlled rate allowing only a portion of the exposed surface of the seed to be exposed to said water released by said water releasing means such that the surface of individual seeds remains sufficiently dry that the seed remains free flowing whilst the water content of the seed is progressively and uniformly raised to a level at which pregermanitive metabolic reactions can take place within the seeds but which does not exceed a value which would allow emergence of the seed radicle.

23. Apparatus as claimed in claim 22 further comprising means for weighing said treatment chamber and means to enable monitoring of the quantity of water released within said treatment chamber in use.

* * * * *

UNITED STATES PATENT AND TRADEMARK OFFICE
CERTIFICATE OF CORRECTION

PATENT NO. : 5,119,589

DATED : June 9, 1992

INVENTOR(S) : ROWSE

It is certified that error appears in the above-identified patent and that said Letters Patent is hereby corrected as shown below:

On title page, item [56], "OTHER PUBLICATIONS"

"Rinus" should be --Pinus--

"(Kazst.)" should be --(Krast)--.

" Dissection)" should be --(Dissertation)--.

"Jacggard-J.agrie" should be --Jaggard-J.Agrie--.

Column 1, line 39, "form" should be --for--;
line 54, "DE-C11091791" should be --DE-C 1091791--.

Column 4, line 47, "avoids in use" should be --avoids use--.

Column 8, line 68, "it is produces" should be --it produces--.

Column 11, Table 6, in line 2 of the title, "of the mean" should be --on the mean--;

Table 6, "10.1 MPa" should be --0.1MPa--;

Table 6, "10.3 MPa" should be --0.3 Mpa--.

Table 6, in the Code Key "Temperature in C" should be --Temperature in °C--.

UNITED STATES PATENT AND TRADEMARK OFFICE
CERTIFICATE OF CORRECTION

PATENT NO. : 5,119,589

DATED : June 9, 1992

INVENTOR(S) : ROWSE

It is certified that error appears in the above-identified patent and that said Letters Patent is hereby corrected as shown below:

Column 11, Table 7, in the Code Key "Temperature in C" should be --Temperature in °C--.

Column 13, Table 9, in the Code Key "Temperature in C" should be --Temperature in °C--.

Column 14, Table 10, in the Code Key "Temperature in C" should be --Temperature in °C--.

Column 14, Table 11, in the Code Key "Temperature in C" should be --Temperature in °C--.

Column 15, Table 13, (all three occurences) "MC" should be --WC--.

Column 16 Table 14, (both occurences) "MC" should be --WC--.

Column 17, line 37, "notion" should be --motion--.

line 43, "of" should be --at--

Column 18, line 49, "seeds i the" should be --seeds in the--.

UNITED STATES PATENT AND TRADEMARK OFFICE
CERTIFICATE OF CORRECTION

PATENT NO. : 5,119,589
DATED : June 9, 1992
INVENTOR(S) : Rowse

It is certified that error appears in the above-indentified patent and that said Letters Patent is hereby corrected as shown below:

Col. 18, line 60, "pregermanitive" should be --pregerminative--

Signed and Sealed this

Eighteenth Day of January, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,119,589

DATED : June 9, 1992

INVENTOR(S) : ROWSE

It is certified that error appears in the above-identified patent and that said Letters Patent is hereby corrected as shown below:

On title page, item [56], "OTHER PUBLICATIONS"

"Rinus" should be --Pinus--

"(Kazst.)" should be -- (Karst) --.

" Dissection)" should be --(Dissertation)--.

"Jacggard-J.agrie" should be --Jaggard-J. Argic--.

Column 1, line 39, "form" should be --for--;

line 54, "DE-C11091791" should be --DE-C 1091791--.

Column 4, line 47, "avoids in use" should be --avoids use--.

Column 8, line 68, "it is produces" should be --it produces--.

Column 11, Table 6, in line 2 of the title, "of the mean" should be --on the mean--;

Table 6, "10.1 MPa" should be --0.1MPa--;

Table 6, "10.3 MPa" should be --0.3 Mpa--.

Table 6, in the Code Key "Temperature in C" should be --Temperature in °C--.

UNITED STATES PATENT AND TRADEMARK OFFICE
CERTIFICATE OF CORRECTION

PATENT NO. : 5,119,589

DATED : June 9, 1992

INVENTOR(S) : ROWSE

Page 2 of 3

It is certified that error appears in the above-identified patent and that said Letters Patent is hereby corrected as shown below:

Column 11, Table 7, in the Code Key "Temperature in C" should be --Temperature in °C--.

Column 13, Table 9, in the Code Key "Temperature in C" should be --Temperature in °C--.

Column 14, Table 10, in the Code Key "Temperature in C" should be --Temperature in °C--.

Column 14, Table 11, in the Code Key "Temperature in C" should be --Temperature in °C--.

Column 15, Table 13, (all three occurences) "MC" should be --WC--.

Column 16 Table 14, (both occurences) "MC" should be --WC--.

Column 17, line 37, "notion" should be --motion--.

line 43, "of" should be --at--

Column 18, line 49, "seeds i the" should be --seeds in the--.

UNITED STATES PATENT AND TRADEMARK OFFICE
CERTIFICATE OF CORRECTION

PATENT NO. : 5,119,589
DATED : June 9, 1992
INVENTOR(S) : Rowse

It is certified that error appears in the above-indentified patent and that said Letters Patent is hereby corrected as shown below:

Col. 18. line 60, "pregermanitive" should be --pregerminative--.

This certificate supersedes Certificate of Correction issued January 18, 1994.

Signed and Sealed this

Ninth Day of August, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,119,589                  Page 1 of 3
DATED     : June 9, 1992
INVENTOR(S) : ROWSE It is certified that error appears in the above-identified patent and that said Letters Patent is hereby corrected as shown below:

On title page, item [56], "OTHER PUBLICATIONS"

"Rinus" should be --Pinus--
    "(Kazst.)" should be --(Krast)--.
    " Dissection)" should be --(Dissertation)--.
    "Jacggard-J.agrie" should be --Jaggard-J.Agric--.

Column 1, line 39, "form" should be --for--;
line 54, "DE-C11091791" should be --DE-C 1091791--.

Column 4, line 47, "avoids in use" should be --avoids use--.

Column 8, line 68, "it is produces" should be --it produces--.

Column 11, Table 6, in line 2 of the title, "of the mean" should be --on the mean--;
    Table 6, "10.1 MPa" should be --0.1MPa--;
    Table 6, "10.3 MPa" should be --0.3 Mpa--.
    Table 6, in the Code Key "Temperature in C" should be --Temperature in °C--.

UNITED STATES PATENT AND TRADEMARK OFFICE
CERTIFICATE OF CORRECTION

PATENT NO. : 5,119,589

DATED : June 9, 1992

INVENTOR(S) : ROWSE

It is certified that error appears in the above-identified patent and that said Letters Patent is hereby corrected as shown below:

Column 11, Table 7, in the Code Key "Temperature in C" should be --Temperature in °C--.

Column 13, Table 9, in the Code Key "Temperature in C" should be --Temperature in °C--.

Column 14, Table 10, in the Code Key "Temperature in C" should be --Temperature in °C--.

Column 14, Table 11, in the Code Key "Temperature in C" should be --Temperature in °C--.

Column 15, Table 13, (all three occurences) "MC" should be --WC--.

Column 16 Table 14, (both occurences) "MC" should be --WC--.

Column 17, line 37, "notion" should be --motion--.
line 43, "of" should be --at--

Column 18, line 49, "seeds i the" should be --seeds in the--.

UNITED STATES PATENT AND TRADEMARK OFFICE
CERTIFICATE OF CORRECTION

PATENT NO. : 5,119,589
DATED : June 9, 1992
INVENTOR(S) : ROWSE

It is certified that error appears in the above-indentified patent and that said Letters Patent is hereby corrected as shown below:

Col. 18. line 60, "pregermanitive" should be —pregerminative—.

This certificate supersedes Certificates of Correction issued January 18, 1994 and August 9, 1994.

Signed and Sealed this

First Day of November, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,119,589  
DATED : June 9, 1992  
INVENTOR(S) : ROWSE

Page 1 of 2

It is certified that error appears in the above-indentified patent and that said Letters Patent is hereby corrected as shown below:

On the Title Page, item [56], "OTHER PUBLICATIONS"
    "Rinus" should be --Pinus--;
    "(Kazst.)" should be --(Karst)--;
    " Dissection)" should be --(Dissertation)--;
    "Jacggard-J.agrie" should be --Jaggard-J.Agric--.

Column 1, line 39, "form" should be --for--;
    line 54, "DE-C11091791" should be --DE-C 1091791--.

Column 4, line 47, "avoids in use" should be --avoids use--.

Column 8, line 68, "it is produces" should be --it produces--.

Column 11, Table 6, in line 2 of the title, "of the mean" should be --on the mean--;
    Table 6, "10.1 MPa" should be --0.1MPa--;
    Table 6, "10.3 MPa" should be --0.3MPa--;
    Table 6, in the Code Key "Temperature in C" should be --Temperature in °C--.

Column 11, Table 7, in the Code Key "Temperature in C" should be --Temperature in °C--.

Column 13, Table 9, in the Code Key "Temperature in C" should be --Temperature in °C--.

Column 14, Table 10, in the Code Key "Temperature in C" should be --Temperature in °C--.

Column 14, Table 11, in the Code Key "Temperature in C" should be --Temperature in °C--.

UNITED STATES PATENT AND TRADEMARK OFFICE
CERTIFICATE OF CORRECTION

PATENT NO. : 5,119,589
DATED : June 9, 1992
INVENTOR(S) : ROWSE

It is certified that error appears in the above-indentified patent and that said Letters Patent is hereby corrected as shown below:

```
Column 15, Table 13, (all three occurrences) "MC" should be
     --WC--.
Column 16, Table 14, (both occurrences) "MC" should be --WC--.
Column 17, line 37, "notion" should be --motion--;
          line 43, "of" should be --at--.
Column 18, line 49, "seeds i the" should be --seeds in the--;
          line 60, "pregermanitive" should be --pregerminative--.
```

This certificate supersedes Certificates of Correction issued January 18, 1994, August 9, 1994 and November 1, 1994.

Signed and Sealed this

Eighteenth Day of April, 1995

Attest:

BRUCE LEHMAN

*Commissioner of Patents and Trademarks*

*Attesting Officer*